US009684990B2

(12) United States Patent
Li et al.

(10) Patent No.: US 9,684,990 B2
(45) Date of Patent: Jun. 20, 2017

(54) METHOD AND TERMINAL FOR DISPLAYING AN ANIMATION

(71) Applicant: Xiaomi Inc., Beijing (CN)

(72) Inventors: Jiangtao Li, Beijing (CN); Min Wang, Beijing (CN); Peng Sun, Beijing (CN)

(73) Assignee: Xiaomi Inc., Beijing (CN)

( * ) Notice: Subject to any disclaimer, the term of this patent is extended or adjusted under 35 U.S.C. 154(b) by 584 days.

(21) Appl. No.: 14/139,479

(22) Filed: Dec. 23, 2013

(65) Prior Publication Data

US 2014/0111524 A1    Apr. 24, 2014

Related U.S. Application Data

(63) Continuation of application No. PCT/CN2013/079301, filed on Jul. 12, 2013.

(30) Foreign Application Priority Data

Sep. 4, 2012   (CN) .......................... 2012 1 0324327
Nov. 15, 2012  (CN) .......................... 2012 1 0461080

(51) Int. Cl.
*G06T 13/80*    (2011.01)
*H04N 5/445*    (2011.01)

(52) U.S. Cl.
CPC .... *G06T 13/80* (2013.01); *H04N 2005/44521* (2013.01)

(58) Field of Classification Search
CPC ......... G06T 13/00; G06T 13/20; G06T 13/40; G06T 13/80; A63F 13/10
USPC ....................................................... 345/473
See application file for complete search history.

(56) References Cited

U.S. PATENT DOCUMENTS

| 6,414,685 | B1 * | 7/2002 | Takakura | G06T 9/00 345/473 |
| 7,898,542 | B1 * | 3/2011 | Yu | G06T 13/00 345/473 |
| 2003/0026422 | A1 | 2/2003 | Gerheim et al. | |
| 2004/0252230 | A1 * | 12/2004 | Winder | G06T 7/2053 348/402.1 |

(Continued)

FOREIGN PATENT DOCUMENTS

| CN | 101727282 |   | 6/2010 |
| CN | 101833447 | A | 9/2010 |

(Continued)

OTHER PUBLICATIONS

"Inbetweening—Wikipedia, the free encyclopedia", dated Sep. 3, 2012; retrieved from the Internet: https://en.wikipedia.org/w/index.php?title=Inbetweening&oldid=510655716 on Dec. 16, 2015 (2 pages).

(Continued)

*Primary Examiner* — Ulka Chauhan
*Assistant Examiner* — Sae Won Yoon
(74) *Attorney, Agent, or Firm* — Finnegan, Henderson, Farabow, Garrett & Dunner LLP (57) ABSTRACT

A method for a terminal to display an animation, including: generating one or more supplementary image frames on a moving path between first and second adjacent original image frames of an animation; and displaying the animation with the generated one or more supplementary image frames at a predetermined frame rate.

7 Claims, 7 Drawing Sheets

(56) References Cited

U.S. PATENT DOCUMENTS

| | | | |
|---|---|---|---|
| 2007/0103585 A1* | 5/2007 | Takeuchi | G06T 3/4007 348/441 |
| 2008/0068359 A1* | 3/2008 | Yoshida | G09G 3/3406 345/204 |
| 2008/0181312 A1 | 7/2008 | Kimura | |
| 2008/0181463 A1* | 7/2008 | Error | H04L 67/36 382/113 |
| 2008/0232705 A1* | 9/2008 | Sohn | H04N 19/00569 382/238 |
| 2009/0080789 A1* | 3/2009 | Shoji | H04N 5/202 382/254 |
| 2009/0179898 A1 | 7/2009 | Bond | |
| 2010/0026904 A1* | 2/2010 | Higuchi | H04N 5/145 348/700 |
| 2010/0118037 A1* | 5/2010 | Sheikh | G06T 13/80 345/473 |
| 2010/0162092 A1* | 6/2010 | Albu | G06T 15/04 715/202 |
| 2010/0231534 A1 | 9/2010 | Chaudhri et al. | |
| 2010/0231535 A1 | 9/2010 | Chaudhri et al. | |
| 2010/0231536 A1 | 9/2010 | Chaudhri et al. | |
| 2010/0231537 A1 | 9/2010 | Pisula et al. | |
| 2010/0302409 A1* | 12/2010 | Matas | H04N 5/772 348/231.99 |
| 2011/0018880 A1 | 1/2011 | Whited et al. | |
| 2012/0147012 A1* | 6/2012 | Lau | G06T 13/00 345/473 |
| 2013/0076758 A1 | 3/2013 | Li et al. | |
| 2013/0091409 A1* | 4/2013 | Jeffery | G06F 17/30056 715/202 |
| 2013/0135339 A1* | 5/2013 | Saini | G09G 5/024 345/613 |

FOREIGN PATENT DOCUMENTS

| | | |
|---|---|---|
| CN | 102169594 A | 8/2011 |
| CN | 102385473 | 3/2012 |
| CN | 102629460 A | 8/2012 |
| CN | 102637107 | 8/2012 |
| CN | 103021007 | 4/2013 |
| JP | 2005160022 A | 6/2005 |
| JP | 2005236472 A | 9/2005 |
| JP | 2007272388 A | 10/2007 |
| JP | 2011049952 A | 3/2011 |
| RU | 2387013 C1 | 4/2010 |
| WO | WO 2008/136116 A1 | 11/2008 |

OTHER PUBLICATIONS

Kawagishi Yuya et al., "Cartoon Blur: Non-Photorealistic Motion Blur", Saitama University dated Apr. 19, 2002 (6 pages).

Office Action mailed by the Russian Patent Office on Feb. 17, 2016, in counterpart Russian Application No. 2014153030 and English translation thereof.

European Search Report for EP 13834614.3 from the European Patent Office, mailed Jan. 5, 2016.

* cited by examiner

METHOD AND TERMINAL FOR DISPLAYING AN ANIMATION

CROSS REFERENCE TO RELATED APPLICATIONS

This application is a continuation of International Application No. PCT/CN2011/079301, filed Jul. 12, 2013, which is based upon and claims priority of Chinese Patent Application No. 201210324327.5, filed Sep. 4, 2012, and of Chinese Patent Application No. 201210461080.1, filed Nov. 15, 2012, the entire contents of which are incorporated herein by reference.

TECHNICAL FIELD

The present disclosure relates generally to an image processing technology and, more particularly, to a method and a terminal for displaying an animation.

BACKGROUND

Most operating systems supporting touch-screen devices, such as the Android operating system, the iOS operating system, or the Windows Phone operating system, use a conventional refresh mode, i.e., single-frame rendering, for graphical interfaces displayed on screens. If a graphical interface is refreshed under the conventional refresh mode at a rate of 60 frames/second, there will be an interval of more than 15 ms between each adjacent two image frames of the graphical interface. When an interface element, such as an icon or text, on a touch screen is moving at a relatively fast speed under control of a user's finger, the interface element will have a relatively large movement distance during an interval of two frames, for example, up to 0.5-3 cm. Due to persistence of vision, a user will observe several discrete images, including intermittent afterimages, resulting in the user's feeling about the graphical interface movement being not smooth or real.

SUMMARY

According to a first aspect of the present disclosure, there is provided a method for a terminal to display an animation, comprising: generating one or more supplementary image frames on a moving path between first and second adjacent original image frames of an animation; and displaying the animation with the generated one or more supplementary image frames at a predetermined frame rate.

According to a second aspect of the present disclosure, there is provided a terminal for displaying an animation, comprising: a processor; a touch screen; and a memory for storing instructions executable by the processor; wherein the processor is configured to: generate one or more supplementary image frames on a moving path between first and second adjacent original image frames of an animation; and display, on the touch screen, the animation with the generated one or more supplementary image frames at a predetermined flame rate.

According to a third aspect of the present disclosure, there is provided a non-transitory computer-readable medium having stored therein instructions that, when executed by a processor in a terminal, cause the terminal to perform: generating one or more supplementary image frames on a moving path between first and second adjacent original image frames of an animation; and displaying the animation with the generated one or more supplementary image frames at a predetermined frame rate.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
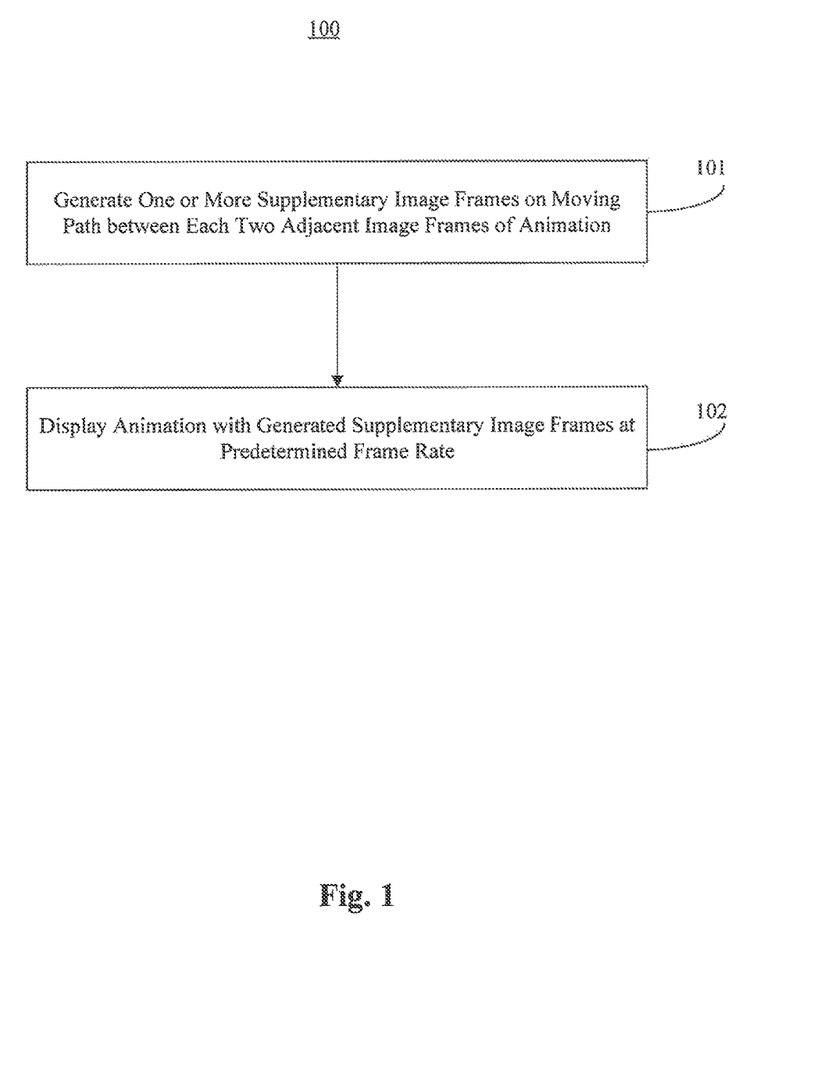
FIG. 1 is a flowchart of a method for a terminal to display an animation, according to an exemplary embodiment.

FIG. 1 is a flowchart of a method 100 for a terminal to display an animation, according to an exemplary embodiment. For example, the terminal may be a mobile terminal. Referring to FIG. 1, the method 100 includes step 101 and step 102. In step 101, before displaying an animation at a predetermined frame rate, the terminal generates one or more supplementary image frames on a moving path between each two adjacent original image frames of the animation. For example, the terminal determines the moving path between two image frames based on a moving path of a graphic interface element, such as an icon or text, in the two image frames. In step 102, the terminal displays the animation with the generated supplementary image frames at the predetermined frame rate. By using the method 100, intermittent afterimages that would otherwise appear between two adjacent original image frames may be removed or reduced, so that a realistic and coherent visual experience may be achieved.

In exemplary embodiments, the terminal generates supplementary image frames from original image frames based on a multiple-drawing method and/or a natural exposure imitation transformation, so that the generated supplementary image frames may cancel the intermittent afterimages generated on the moving path between two adjacent original image frames. However, the method 100 is not so limited, and can generate supplementary image frames according to different animation display performance and quality requirements.

In exemplary embodiments, based on the multiple-drawing method, the terminal renders multiple drawings of a previous original image frame along the moving path between the previous playback image frame and a subsequent playback image frame of the animation, according to a playback timing of each image frame of the animation. For example, the terminal determines a transparency for each supplementary image frame to be generated based on the previous original image frame, according to a length of the moving path between the previous original image frame and the subsequent original image frame and pixels per inch (PPIs) of a graphical interface, and renders multiple drawings of the previous original image frame along the moving path with the determined transparency. In one exemplary embodiment, a relatively smooth and coherent visual experience is achieved at a frame rate of 24 frames/second or more.

In exemplary embodiments, based on the natural exposure imitation transformation, the terminal performs an image transformation, which may be implemented using image matrixes, to pixels on the moving path between a previous original image frame and a subsequent original image frame of the animation, to obtain supplementary image frames, also according to a playback timing of each image frame of the animation. For example, with regard to the pixels on the moving path between the previous original image frame and the subsequent original image frame of the animation, the terminal performs a plurality of one-dimensional compression transformations on RGB color information and opacity information of the pixels based on a length of the moving path and locations of the pixels: Accordingly, the terminal compresses, at a predetermined compression ratio, the pixels to a plurality of one-dimensional images each with a transparency, thereby to generate the supplementary image frames.

In one exemplary embodiment, an image matrix M having a size of m×n may be used to represent the pixels on the moving path between the previous original image frame and the subsequent original image frame. Further, it is assumed that a represents he length of the moving path; P (i, j) represents a value of RGB color information of a pixel located at row i and column j in the image matrix M; and $P_1$ (x, j) represents the same parameter of a pixel located at row x and column j after the one-dimensional compression transformation. The one-dimensional compression transformation may then be expressed as follows:

When a>m, $$P_1(x, j) = \frac{\sum_{i=0}^{x} P(i, j)}{a} \quad (0 < x < m); \quad \text{equation (1)}$$

$$P_1(x, j) = \frac{\sum_{i=0}^{m} P(i, j)}{a} \quad (m < x < a); \quad \text{equation (2)}$$

$$P_1(x, j) = \frac{\sum_{i=x-a}^{m} P(i, j)}{a} \quad (a < x < a+m); \quad \text{equation (3)}$$

When a<m, $$P_1(x, j) = \frac{\sum_{i=0}^{x} P(i, j)}{a} \quad (0 < x < a); \quad \text{equation (4)}$$

$$P_1(x, j) = \frac{\sum_{i=x-a}^{x} P(i, j)}{a} \quad (a < x < m); \quad \text{equation (5)}$$

$$P_1(x, j) = \frac{\sum_{i=x-a}^{m} P(i, j)}{a} \quad (m < x < a+m). \quad \text{equation (6)}$$

In the above illustrated embodiment based on the natural exposure imitation transformation, the generated supplementary image frames can have the same effect as a natural exposure of an original image frame within the time length of one frame, so that visual experience is enhanced.

In exemplary embodiments, the terminal has a touch screen. A user's finger sliding over a graphical interface displayed on the touch screen results in a movement of the graphical interface. When detecting the movement of the graphical interface, the terminal generates supplementary image frames on a moving path between each two adjacent original image frames, and renders and outputs the supplementary image frames using the method 100. The generated supplementary image frames each have a transparency relating to a moving speed or a moving distance. The moving distance is calculated by multiplying the moving speed by a refresh time determined according to a refresh rate of the graphical interface.

Figure 2:
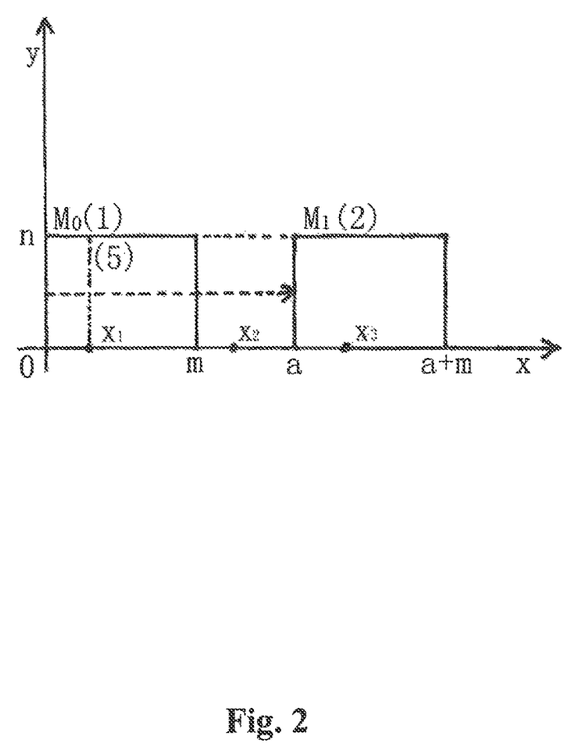
FIG. 2 is a diagram showing two adjacent original image frames of an animation, according to an exemplary embodiment.
Figure 3:
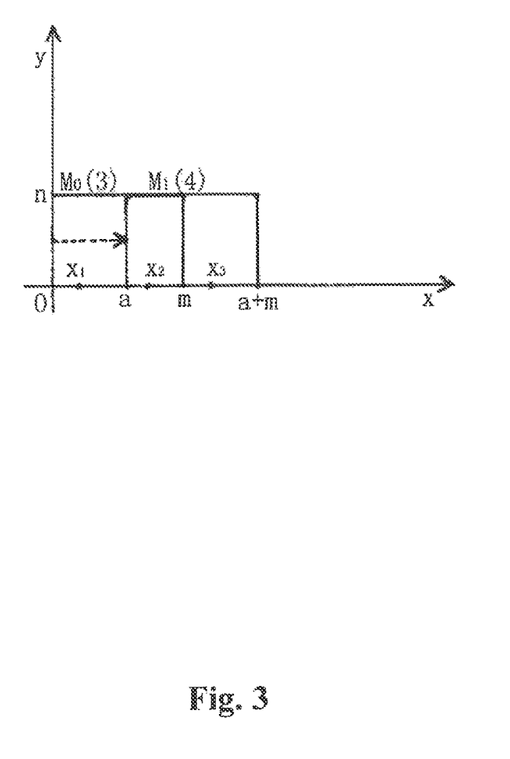
FIG. 3 is a diagram showing two adjacent original image frames of an animation, according to an exemplary embodiment.

FIG. 2 and FIG. 3 are diagrams each showing two adjacent original image frames of an animation, according to exemplary embodiments. In FIG. 2, it is assumed that a previous image frame $M_0$(1) and a subsequent image frame $M_1$(2) corresponding to a same graphical interface element, such as a rectangular icon or text, do not overlap on the screen and are separated by a moving distance a which is larger than an image matrix length m. in FIG. 3, it is assumed that a previous image frame $M_0$(3) and a subsequent image frame $M_1$(4) corresponding to a same graphical interface element, such as a rectangular icon or text, overlap on the screen and are separated by a movement distance a which is smaller than the image matrix length m.

In one exemplary embodiment, the terminal performs the one-dimensional compression transformation to generate supplementary image frames. For example, for locations x1, x2, and x3 in FIG. 2, the terminal uses equations (1), (2), and (3), respectively, to perform the one-dimensional compression transformation, to generate first, second, and third one-dimensional images corresponding to the locations x1, x2, and x3, respectively. Also for example, for locations x1, x2, and x3 in FIG. 3, the terminal uses equations (4), (5), and (6), respectively, to perform the one-dimensional compression transformation, to generate first, second, and third one-dimensional images corresponding to the locations x1, x2, and x3, respectively.

Specifically, in the illustrated embodiment, the terminal performs the one-dimensional compression transformation on four variables, i.e., each component of RGB color information, based on equations (1)-(3) (FIG. 2) or equations (4)-(6) (FIG. 3). Accordingly, the terminal obtains a series of one-dimensional images from x=0 to x=a+m, thereby to generate the supplementary image frames. For example, for the pixels in the area corresponding to $0<x<x1$ and $0<y<n$ in FIG. 2, the terminal compresses those pixels to a one-dimensional image represented by a dotted line (5) at x=x1.

in one exemplary embodiment, the terminal renders multiple drawings of the previous original image frame along the moving path to generate supplementary images. Each generated supplementary image frame has a determined transparency relating to a moving speed of the graphical interface. The transparency of a supplementary image frame is inversely proportional to the moving speed of the graphical interface, and is also determined by pixels per inch (PPIs) of the screen and a frame sequence.

Also referring to FIG. 2 and FIG. 3, when the graphical interface is sliding, the terminal records coordinates passed by the previous image frame $M_0(1)$ or $M_0(3)$, and renders multiple drawings along the moving path from the coordinate of the previous image frame $M_0(1)$ or $M_0(3)$ to the coordinate of (be subsequent image frame $M_1(2)$ or $M_1(4)$. In one exemplary embodiment, the terminal renders multiple drawings every k points (pixels) according to different pixels per inch, or PPIs, and distances, and each generated supplementary image frame has a determined transparency relating to the moving speed of the graphical interface. A relationship between the transparency of the supplementary image frame and a moving distance of this frame is obtained by adjusting an inverse proportion curve of k/a, where k is a predetermined constant, and a represents the moving distance. In one exemplary embodiment, a shape of the curve is adjusted according to actual tests, so that a final image after the processing is dose to the image formed from the original image frame by the natural exposure in the time length of one frame.

Figure 4A:
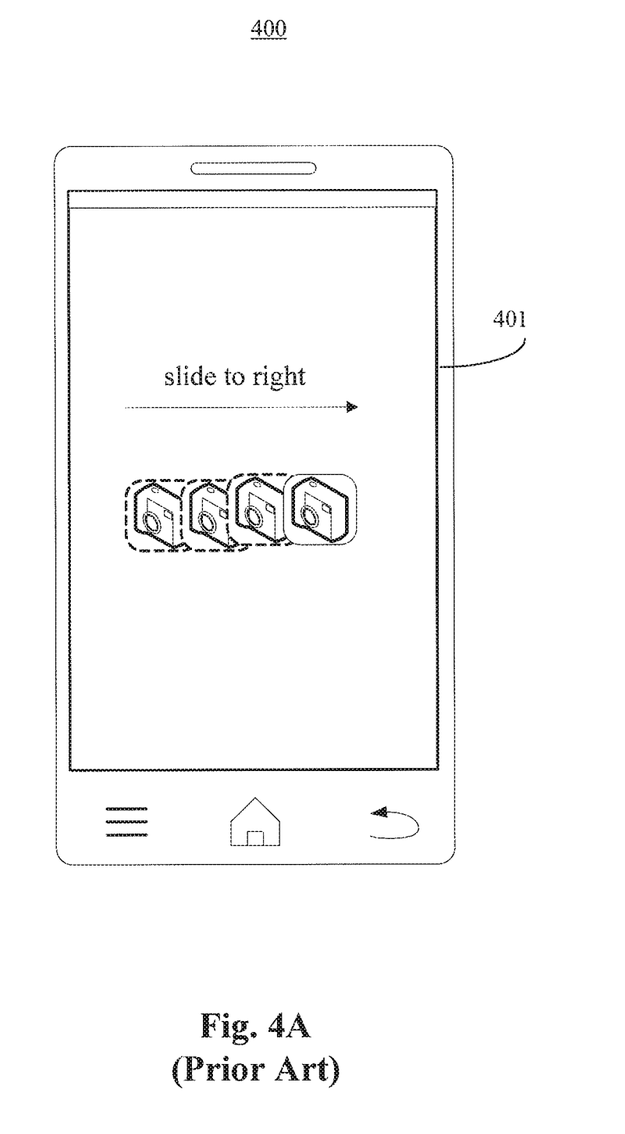
FIG. 4A is a diagram showing an animation displayed on a screen of a terminal when a conventional method is used.

FIG. 4A is a diagram showing an animation displayed on a screen 401 of a terminal 400 when the conventional method of single-frame rendering is used. Referring to FIG. 4A, an example of a camera icon on a graphical interface shows the animation of a sliding process. When the user's finger slides over the touch screen 401, assuming that the touch screen 401 performs single-frame rendering at a refresh rate of 60 frames/second, there will be an interval of more than 15 ms between each two adjacent image frames. If the camera icon has a moving speed of about 0.3 m/s, the moving distance between two adjacent image frames is about 0.5 cm. Due to persistence of vision, the user will see intermittent afterimages appearing between two adjacent image frames, as shown in FIG. 4A.

Figure 4B:
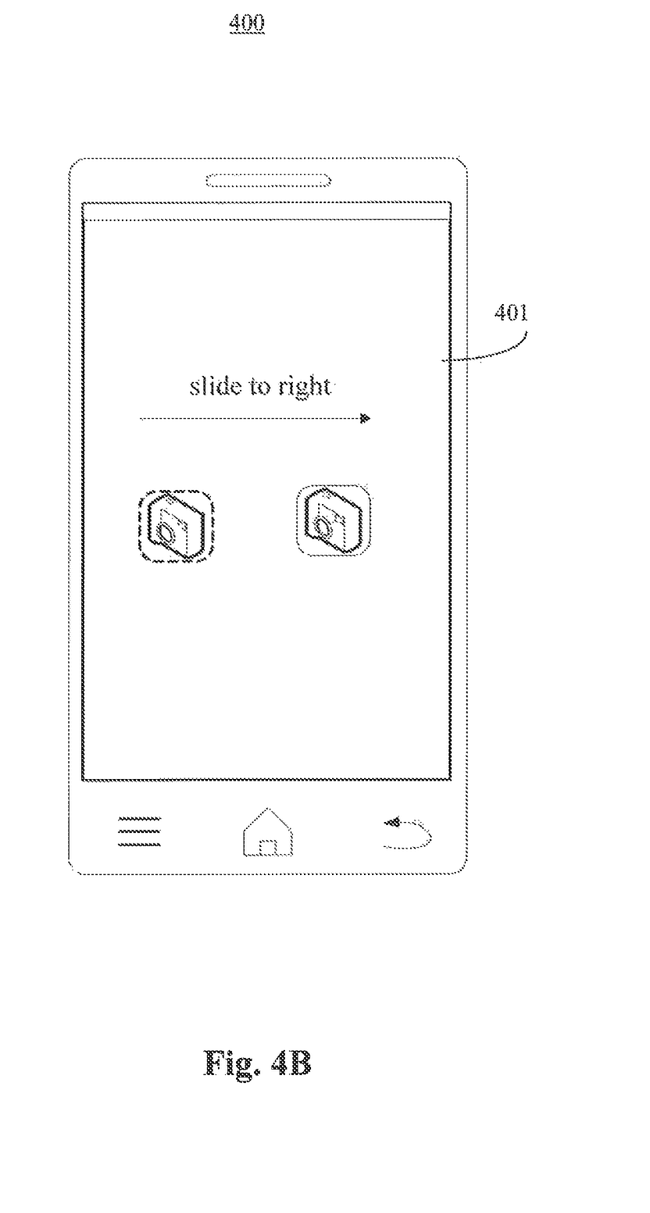
FIG. 4B is a diagram showing an animation displayed on a screen of a terminal, according to an exemplary embodiment.

FIG. 4B is a diagram showing an animation displayed on the screen 401 of the terminal 400 when the method 100 (FIG. 1) is used. Referring to FIG. 4B, an example of a camera icon on a graphical interface shows the animation of a sliding process. By using the method 100, the terminal generates supplementary image frames to cancel intermittent afterimages generated on the moving path of two original image frames, so that the user will not see intermittent afterimages, as shown in FIG. 4B. As a result, a smooth sliding experience may be achieved.

Figure 5:
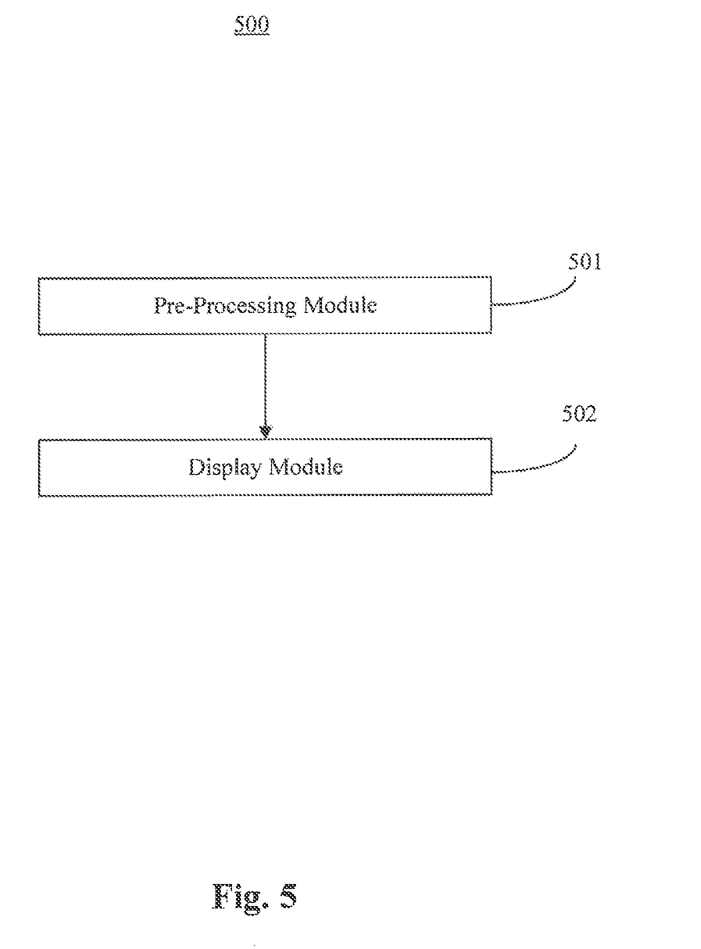
FIG. 5 is a block diagram of a terminal for displaying an animation, according to an exemplary embodiment.

FIG. 5 illustrates a block diagram of a terminal 500, according to an exemplary embodiment. Referring to FIG. 5, the terminal 500 includes a pre-processing module 501 and a display module 502.

In exemplary embodiments, the pre-processing module 501 is configured to generate supplementary image frames on a moving path between each two adjacent original image frames of the animation and the display module 502 is configured to display the animation with the generated supplementary image frames at a predetermined frame rate.

In exemplary embodiments, the pre-processing module 501 includes first and second pre-processing units. The first pre-processing unit is configured to generate the supplementary image frames on the moving path between each two adjacent original image frames of the animation based on the multiple-drawing method described above. The second pre-processing unit is configured to generate the supplementary image frames on the moving path between each two adjacent original image frames of the animation based on the natural exposure imitation transformation described above.

One skilled in the art will understand that multiple models in the exemplary embodiments may be combined into one module, and one model may be divided into multiple models. Each model may be implemented with software, hardware, or a combination of software and hardware.

Figure 6:
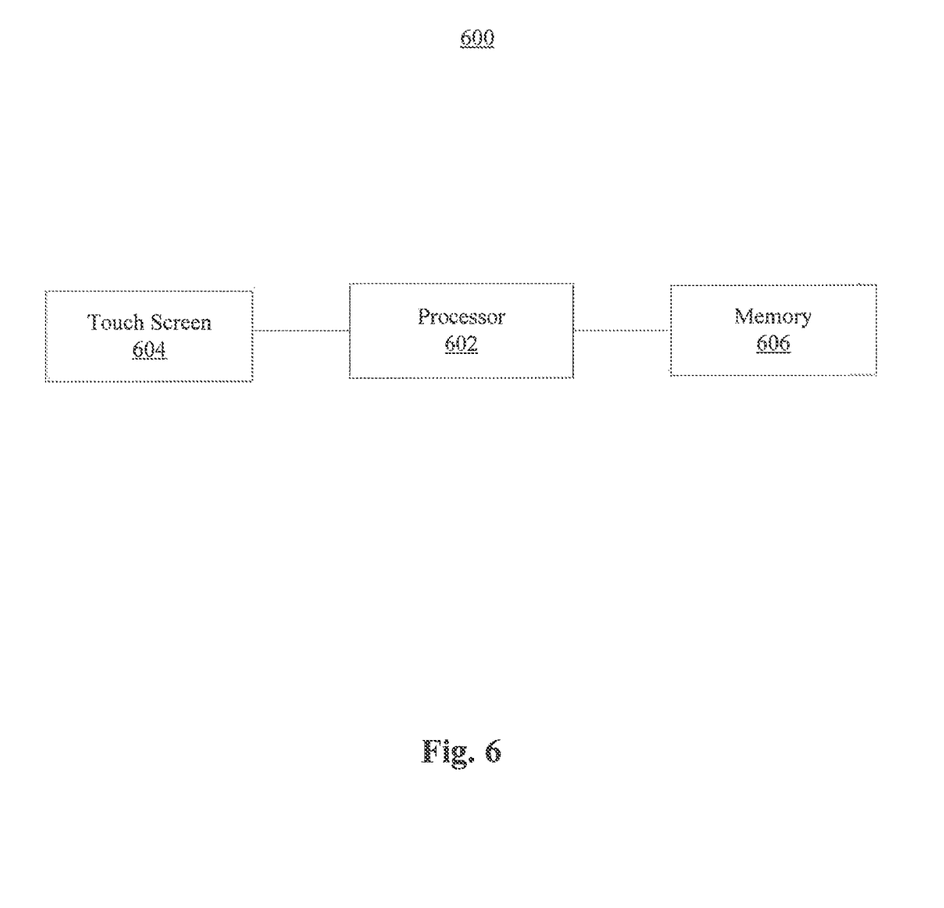
FIG. 6 is a block diagram of a terminal for displaying an animation, according to an exemplary embodiment.

FIG. 6 illustrates a block diagram of a terminal 600 for displaying an animation, according to an exemplary embodiment. Referring to FIG. 6, the terminal 600 includes a processor 602 and a touch screen 604. The terminal 600 also includes memory resources, represented by a memory 606, for storing data as well as for storing program instructions and otherwise facilitating operation of the processor 602, In exemplary embodiments, there is provided a non-transitory storage medium including instructions, such as included in the memory 606, executable by the processor 602 in the terminal 600, for performing the above described animation displaying methods, Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof It is intended that the scope of the invention only be limited by the appended claims.

What is claimed is:

1. A method for a terminal to display an animation, comprising:

generating, by the terminal, one or more supplementary image frames on a moving path between first and second adjacent original image frames of an animation, based on a natural exposure imitation transformation; and displaying, by the terminal, the animation with the generated one or more supplementary image frames at a predetermined frame rate, wherein generating the one or more supplementary image, frames based, on the natural exposure imitation transformation includes: performing an image transformation on pixels on the moving path between the first original image frame and the second original image frame, to generate the one or more supplementary image frames according to a playback timing of each image frame of the animation;

wherein performing the image transformation includes: performing a plurality of one-dimensional compression transformation on RGB color information of the pixels based on a length of the moving path and locations of the pixels; and wherein performing the plurality of one-dimensional compression transformations includes; compressing, based on the length of the moving path and the locations of the pixels, the pixels to a plurality of one-dimensional images each with a transparency, thereby to generate the one or more supplementary images.

2. The method according to claim 1, further comprising:
generating one or more supplementary image frames based on an original image frame multiple-drawing method by rendering multiple drawings of the first original image frame along the moving path according to the playback timing of each image frame of the animation.

3. The method according to claim 1, wherein an image matrix M having a size of m×n is used to represent the pixels, m being a first positive integer and representing a fast number of pixels corresponding to a first side of the image matrix M, n being a second positive integer and representing a second number of pixels corresponding to a second side of the image matrix M, and wherein a is a third positive integer and represents a third number of pixels corresponding to the length of the moving path, the method further comprising:
when a>m, performing a calculation as follows:

$$P_1(x, j) = \frac{\sum_{i=0}^{x} P(i, j)}{a} \quad (0 < x < m);$$

$$P_1(x, j) = \frac{\sum_{i=0}^{m} P(i, j)}{a} \quad (m < x < a);$$

$$P_1(x, j) = \frac{\sum_{i=x-a}^{m} P(i, j)}{a} \quad (a < x < a+m);$$

when a<m, performing a calculation as follows:

$$P_1(x, j) = \frac{\sum_{i=0}^{x} P(i, j)}{a} \quad (0 < x < a);$$

$$P_1(x, j) = \frac{\sum_{i=x-a}^{x} P(i, j)}{a} \quad (a < x < m);$$

$$P_1(x, j) = \frac{\sum_{i=x-a}^{m} P(i, j)}{a} \quad (m < x < a+m);$$

wherein P(i,j) represents a value of RGB color information of a pixel located at row i and column j in the image matrix M; and $P_1$(x, j) represents a corresponding parameter of a pixel located at row x and column j after the one-dimensional compression transformation.

4. A terminal for displaying an animation, comprising:
a processor;
a touch screen; and
a memory for storing instructions executable by the processor;
wherein the processor is configured to:
generate one or more supplementary image frames on a moving path between first and second adjacent original image frames of an animation, based on a natural exposure imitation transformation; and
display, on the touch screen, the animation with the generated one or more supplementary image frames at a predetermined frame rate,
wherein the processor is further configured to generate the one or more supplementary image frames based on the natural exposure imitation transformation by performing an image transformation on pixels on the moving path between the first original image frame and the second original image frame, to generate the one or more supplementary image frames according to a playback timing of each image frame of the animation;
wherein the processor is further configured to perform a plurality of one-dimensional compression transformations on RGB color information of the pixels based on a length of the moving path and locations of the pixels to perform the image transformation; and
wherein the processor is further configured to compress, based on the length of the moving path and the locations of the pixels, the pixels to a plurality of one-dimensional images each with a transparency, thereby to generate the one or more supplementary images.

5. The terminal according to claim 4, wherein the processor is further configured to:
generate one or more supplementary image frames based on an original image frame multiple-drawing method by rendering multiple drawings of the first original image frame along the moving path according to the playback timing of each image frame of the animation.

6. The terminal according to claim 4, wherein an image matrix M having a size of m×n is used to represent the pixels, m being a first positive integer and representing a first number of pixels corresponding to a first side of the image matrix M, n being a second positive integer and representing a second number of pixels corresponding to a second side of the image matrix M, and wherein a is a third positive integer and represents a third number of pixels corresponding to the length of the moving path, the processor being further configured to:
when a>m, perform a calculation as follows:

$$P_1(x, j) = \frac{\sum_{i=0}^{x} P(i, j)}{a} \quad (0 < x < m);$$

$$P_1(x, j) = \frac{\sum_{i=0}^{m} P(i, j)}{a} \quad (m < x < a);$$

$$P_1(x, j) = \frac{\sum_{i=x-a}^{m} P(i, j)}{a} \quad (a < x < a+m);$$

when a<m, perform a calculation as follows:

$$P_1(x, j) = \frac{\sum_{i=0}^{x} P(i, j)}{a} \quad (0 < x < a);$$

$$P_1(x, j) = \frac{\sum_{i=x-a}^{x} P(i, j)}{a} \quad (a < x < m);$$

-continued $$P_1(x, j) = \frac{\sum_{i=x-a}^{m} P(i, j)}{a} \quad (m < x < a + m);$$

wherein P (i,j) represents a value of RGB color information of a pixel located at row i and column j in the image matrix M; and $P_1$ (x,j) represents a corresponding parameter of a pixel located at row x and column j after the one-dimensional compression transformation.

7. A non-transitory computer-readable medium having stored therein instructions that, when executed by a processor in a terminal, cause the terminal to perform a method for displaying an animation, the method comprising:

generating one or more supplementary image frames on a moving path between first and second adjacent original image frames of an animation, based on a natural exposure imitation transformation; and displaying the animation with the generated one or more supplementary image frames at a predetermined frame rate, wherein generating the one or more supplementary image frames based on the natural exposure imitation transformation includes: performing an image transformation on pixels on the moving path between the first original image frame and the second original image frame, to generate the one or more supplementary image frames according to a playback timing of each image frame of the animation;

wherein performing the image transformation includes; performing a plurality of one-dimensional compression transformation on RGB color information of the pixels based on a length of the moving path and locations of the pixels; and wherein performing the plurality of one-dimensional compression transformations includes; compressing, based on the length of the moving path and the locations of the pixels, the pixels to a plurality of one-dimensional images each with a transparency, thereby to generate the one or more supplementary images.

* * * * *